(12) United States Patent
Yonge, III et al.

(10) Patent No.: US 7,636,370 B2
(45) Date of Patent: Dec. 22, 2009

(54) RESERVING TIME PERIODS FOR COMMUNICATION ON POWER LINE NETWORKS

(75) Inventors: Lawrence W. Yonge, III, Ocala, FL (US); Srinivas Katar, Ocala, FL (US)

(73) Assignee: Intellon Corporation, Ocala, FL (US)

( * ) Notice: Subject to any disclaimer, the term of this patent is extended or adjusted under 35 U.S.C. 154(b) by 559 days.

(21) Appl. No.: 11/071,059

(22) Filed: Mar. 3, 2005

(65) Prior Publication Data

US 2006/0198387 A1      Sep. 7, 2006

(51) Int. Cl.
*H04L 12/413* (2006.01)
(52) U.S. Cl. .................................... 370/445; 370/465
(58) Field of Classification Search ................ 370/445, 370/446, 447, 448, 459, 462, 466, 467, 469
See application file for complete search history.

(56) References Cited

U.S. PATENT DOCUMENTS

| | | | |
|---|---|---|---|
| 3,806,885 A | 4/1974 | Moore | |
| 4,569,044 A | 2/1986 | Tao et al. | |
| 4,581,734 A | 4/1986 | Olson et al. | |
| 4,630,261 A | 12/1986 | Irvin | |
| 4,677,612 A | 6/1987 | Olson et al. | |
| 4,682,324 A | 7/1987 | Ulug | |
| 4,720,850 A | 1/1988 | Oberlander et al. | |
| 4,726,018 A | 2/1988 | Bux et al. | |
| 4,792,947 A | 12/1988 | Takiyasu et al. | |
| 4,819,229 A | 4/1989 | Pritty et al. | |
| 4,881,241 A | 11/1989 | Pommier et al. | |
| 4,943,959 A | 7/1990 | Arnold | |
| 5,001,472 A | 3/1991 | Fischer et al. | |
| 5,003,539 A | 3/1991 | Takemoto et al. | |

(Continued)

FOREIGN PATENT DOCUMENTS

DE        3413144        10/1985

(Continued)

OTHER PUBLICATIONS

Sun et al., Public-key ID-based Cryptosystem, 1991, IEEE, pp. 142-144.

(Continued)

*Primary Examiner*—Chirag G Shah
*Assistant Examiner*—Otis L Thompson, Jr.
(74) *Attorney, Agent, or Firm*—Fish & Richardson P.C.

(57) ABSTRACT

Methods of operating in a network in which a plurality of stations communicate over a shared medium and contend for access during a priority resolution period. At least some of the stations use a first CSMA network protocol having certain characteristics (e.g., some transmissions have a format that includes a start of frame delimiter (SOF), a payload, and an end of frame delimiter (EOF), wherein the SOF and EOF each contain sufficient information to permit a station receiving only one of the SOF and EOF to determine the start of a priority resolution period). And at least some stations use a second network protocol capable of coexisting with the first protocol, so that stations may communicate using either the first or second protocol. The second protocol may have various characteristics configured to achieve coexistence with the first protocol (e.g., transmissions that have a format that includes an SOF but not an EOF).

25 Claims, 12 Drawing Sheets

U.S. PATENT DOCUMENTS

| | | | |
|---|---|---|---|
| 5,046,069 A | 9/1991 | Calvignac et al. | |
| 5,081,678 A | 1/1992 | Kaufman et al. | |
| 5,105,423 A | 4/1992 | Tanaka et al. | |
| 5,121,396 A | 6/1992 | Irvin et al. | |
| 5,140,584 A | 8/1992 | Suzuki | |
| 5,157,659 A | 10/1992 | Schenkel | |
| 5,197,061 A | 3/1993 | Halbert-Lassalle et al. | |
| 5,214,646 A | 5/1993 | Yacoby | |
| 5,228,025 A | 7/1993 | Le Floch et al. | |
| 5,231,634 A | 7/1993 | Giles et al. | |
| 5,274,629 A | 12/1993 | Helard et al. | |
| 5,280,480 A | 1/1994 | Pitt et al. | |
| 5,307,376 A | 4/1994 | Castelain et al. | |
| 5,339,313 A | 8/1994 | Ben-Michael et al. | |
| 5,343,473 A | 8/1994 | Cidon et al. | |
| 5,384,777 A | 1/1995 | Ahmadi et al. | |
| 5,416,801 A | 5/1995 | Chouly et al. | |
| 5,426,646 A | 6/1995 | Slack | |
| RE35,001 E | 7/1995 | Grow | |
| 5,432,848 A | 7/1995 | Butter et al. | |
| 5,436,905 A | 7/1995 | Li et al. | |
| 5,448,565 A | 9/1995 | Chang et al. | |
| 5,452,288 A | 9/1995 | Rahuel et al. | |
| 5,452,322 A | 9/1995 | Lauer | |
| 5,473,602 A | 12/1995 | McKenna et al. | |
| 5,481,535 A | 1/1996 | Hershey | |
| 5,483,529 A | 1/1996 | Baggen et al. | |
| 5,488,632 A | 1/1996 | Mason et al. | |
| 5,504,747 A | 4/1996 | Sweazey | |
| 5,515,379 A | 5/1996 | Crisler et al. | |
| 5,524,027 A | 6/1996 | Huisken | |
| 5,537,414 A | 7/1996 | Takiyasu et al. | |
| 5,541,922 A | 7/1996 | Pyhalammi | |
| 5,548,649 A | 8/1996 | Jacobson | |
| 5,555,268 A | 9/1996 | Fattouche et al. | |
| 5,563,883 A | 10/1996 | Cheng | |
| 5,563,897 A | 10/1996 | Pyndiah et al. | |
| 5,568,476 A | 10/1996 | Sherer et al. | |
| 5,610,908 A | 3/1997 | Shelswell et al. | |
| 5,612,975 A | 3/1997 | Becker et al. | |
| 5,615,212 A | 3/1997 | Ruszczyk et al. | |
| 5,619,651 A | 4/1997 | Young | |
| 5,623,512 A | 4/1997 | Sasaki | |
| 5,627,829 A | 5/1997 | Gleeson et al. | |
| 5,629,948 A | 5/1997 | Hagiwara et al. | |
| 5,636,230 A | 6/1997 | Marturano et al. | |
| 5,644,576 A | 7/1997 | Bauchot et al. | |
| 5,651,009 A | 7/1997 | Perreault et al. | |
| 5,694,389 A | 12/1997 | Seki et al. | |
| 5,706,348 A | 1/1998 | Gray et al. | |
| 5,717,689 A | 2/1998 | Ayanoglu | |
| 5,732,113 A | 3/1998 | Schmidl et al. | |
| 5,737,330 A | 4/1998 | Fulthorp et al. | |
| 5,745,769 A | 4/1998 | Choi | |
| 5,757,766 A | 5/1998 | Sugita | |
| 5,757,770 A | 5/1998 | Lagoutte et al. | |
| 5,764,931 A | 6/1998 | Schmahl et al. | |
| 5,771,235 A | 6/1998 | Tang et al. | |
| 5,787,071 A | 7/1998 | Basso et al. | |
| 5,790,541 A | 8/1998 | Patrick et al. | |
| 5,793,307 A | 8/1998 | Perreault et al. | |
| 5,799,033 A | 8/1998 | Baggen | |
| 5,812,599 A | 9/1998 | Van Kerckhove | |
| 5,818,821 A | 10/1998 | Schurig | |
| 5,818,826 A | 10/1998 | Gfeller et al. | |
| 5,825,807 A | 10/1998 | Kumar | |
| 5,828,677 A | 10/1998 | Sayeed et al. | |
| 5,841,778 A | 11/1998 | Shaffer et al. | |
| 5,841,873 A | 11/1998 | Lockhart et al. | |
| 5,884,040 A | 3/1999 | Chung | |
| 5,886,993 A | 3/1999 | Ruszczyk et al. | |
| 5,892,769 A | 4/1999 | Lee | |
| 5,896,561 A | 4/1999 | Schrader et al. | |
| 5,903,614 A | 5/1999 | Suzuki et al. | |
| 5,914,932 A | 6/1999 | Suzuki et al. | |
| 5,914,959 A | 6/1999 | Marchetto et al. | |
| 5,940,399 A | 8/1999 | Weizman | |
| 5,940,438 A | 8/1999 | Poon et al. | |
| 5,948,060 A | 9/1999 | Gregg et al. | |
| 5,956,338 A | 9/1999 | Ghaibeh | |
| 5,966,412 A | 10/1999 | Ramaswamy | |
| 5,970,062 A | 10/1999 | Bauchot | |
| 5,987,011 A | 11/1999 | Toh | |
| 6,005,894 A | 12/1999 | Kumar | |
| 6,006,017 A | 12/1999 | Joshi et al. | |
| 6,041,063 A | 3/2000 | Povlsen et al. | |
| 6,041,358 A | 3/2000 | Huang et al. | |
| 6,044,154 A | 3/2000 | Kelly | |
| 6,044,482 A | 3/2000 | Wong | |
| 6,052,377 A | 4/2000 | Ohmi et al. | |
| 6,076,115 A | 6/2000 | Sambamurthy et al. | |
| 6,092,214 A | 7/2000 | Quoc et al. | |
| 6,097,703 A | 8/2000 | Larsen et al. | |
| 6,098,179 A | 8/2000 | Harter, Jr. | |
| 6,108,713 A | 8/2000 | Sambamurthy et al. | |
| 6,125,150 A | 9/2000 | Wesel et al. | |
| 6,130,887 A | 10/2000 | Dutta | |
| 6,130,894 A | 10/2000 | Ojard et al. | |
| 6,151,296 A | 11/2000 | Vijayan et al. | |
| 6,169,744 B1 | 1/2001 | Grabelsky et al. | |
| 6,182,147 B1 | 1/2001 | Farinacci | |
| 6,188,717 B1 | 2/2001 | Kaiser et al. | |
| 6,192,397 B1 | 2/2001 | Thompson | |
| 6,202,082 B1 | 3/2001 | Tomizawa et al. | |
| 6,215,792 B1 | 4/2001 | Abi-Nassif | |
| 6,216,244 B1 | 4/2001 | Myers et al. | |
| 6,222,851 B1 | 4/2001 | Petry | |
| 6,243,386 B1 | 6/2001 | Chan et al. | |
| 6,243,449 B1 | 6/2001 | Margulis et al. | |
| 6,246,770 B1 | 6/2001 | Stratton et al. | |
| 6,252,849 B1 | 6/2001 | Rom et al. | |
| 6,259,696 B1 | 7/2001 | Yazaki et al. | |
| 6,263,445 B1 | 7/2001 | Blumenau | |
| 6,278,685 B1 | 8/2001 | Yonge, III et al. | |
| 6,278,716 B1 | 8/2001 | Rubenstein et al. | |
| 6,289,000 B1 | 9/2001 | Yonge, III | |
| 6,295,296 B1 | 9/2001 | Tappan | |
| 6,334,185 B1 | 12/2001 | Hansson et al. | |
| 6,343,083 B1 | 1/2002 | Mendelson et al. | |
| 6,363,052 B1 | 3/2002 | Hosein | |
| 6,370,156 B2 | 4/2002 | Spruyt et al. | |
| 6,385,672 B1 | 5/2002 | Wang et al. | |
| 6,397,368 B1 | 5/2002 | Yonge, III et al. | |
| 6,421,725 B1 | 7/2002 | Vermilyea et al. | |
| 6,430,192 B1 | 8/2002 | Creedon et al. | |
| 6,430,661 B1 | 8/2002 | Larson et al. | |
| 6,434,153 B1 | 8/2002 | Yazaki et al. | |
| 6,442,129 B1 | 8/2002 | Yonge, III et al. | |
| 6,456,649 B1 | 9/2002 | Isaksson et al. | |
| 6,466,580 B1 | 10/2002 | Leung | |
| 6,469,992 B1 | 10/2002 | Schieder | |
| 6,473,435 B1 | 10/2002 | Zhou et al. | |
| 6,480,489 B1 | 11/2002 | Muller et al. | |
| 6,487,212 B1 | 11/2002 | Erimli et al. | |
| 6,501,760 B1 | 12/2002 | Ohba et al. | |
| 6,519,263 B1 | 2/2003 | Huth | |
| 6,526,451 B2 | 2/2003 | Kasper | |
| 6,538,985 B1 | 3/2003 | Petry et al. | |
| 6,553,534 B2 | 4/2003 | Yonge, III et al. | |
| 6,567,914 B1 | 5/2003 | Just et al. | |
| 6,577,630 B1 * | 6/2003 | Markwalter et al. | ......... 370/392 |
| 6,654,410 B2 | 11/2003 | Tzannes | |
| 6,667,991 B1 | 12/2003 | Tzannes | |
| 6,671,284 B1 | 12/2003 | Yonge, III et al. | |

| | | | |
|---|---|---|---|
| 6,747,976 | B1 | 6/2004 | Bensaou et al. |
| 6,765,885 | B2 | 7/2004 | Jiang et al. |
| 6,778,507 | B1 | 8/2004 | Jalali |
| 7,305,009 | B2 * | 12/2007 | Gaskill ............... 370/470 |
| 2001/0012319 | A1 | 8/2001 | Foley |
| 2001/0043576 | A1 | 11/2001 | Terry |
| 2001/0048692 | A1 | 12/2001 | Karner |
| 2002/0001314 | A1 | 1/2002 | Yi et al. |
| 2002/0012320 | A1 | 1/2002 | Ogier et al. |
| 2002/0042836 | A1 | 4/2002 | Mallory |
| 2002/0048368 | A1 | 4/2002 | Gardner |
| 2002/0065047 | A1 | 5/2002 | Moose |
| 2002/0131591 | A1 | 9/2002 | Henson et al. |
| 2002/0191533 | A1 | 12/2002 | Chini et al. |
| 2003/0006883 | A1 | 1/2003 | Kim et al. |
| 2003/0079169 | A1 | 4/2003 | Ho et al. |
| 2003/0174664 | A1 | 9/2003 | Benveniste |
| 2003/0217182 | A1 | 11/2003 | Liu et al. |
| 2003/0231652 | A1 | 12/2003 | Sprague et al. |
| 2003/0231658 | A1 | 12/2003 | Liang et al. |
| 2004/0001499 | A1 | 1/2004 | Patella et al. |
| 2004/0008728 | A1 | 1/2004 | Lee |
| 2004/0184481 | A1 | 9/2004 | Lee |
| 2005/0122994 | A1 | 6/2005 | Mangin et al. |

FOREIGN PATENT DOCUMENTS

| | | |
|---|---|---|
| WO | 98/57440 | 12/1998 |
| WO | 00/72495 | 11/2000 |
| WO | 02/41598 | 5/2002 |

OTHER PUBLICATIONS

Kamerman, A; Aben, G; Net throughput with IEEE 802.11 wireless LANs; Wireless Communications and Networking Conference, 2000. WCNC 2000 IEEE, vol. 2, Sep. 23-28, 2000; pp. 747-752.

Dube, P.; Altman, E.; Queueing analysis of early message discard policy; Communications, 2002. ICC 2002. IEEE International Conference, vol. 4, Iss., 2002, pp. 2426-2430.

Bruschi, Danilo, Secure Multicast in Wireless Networks of Mobile Hosts: Protocols and Issues, 2002, Mobile Networks and Applications, pp. 503-511.

IBM, Combined use of collision resolution and collision avoidance MAC protocols, Oct. 1, 1994, IBM Technical Disclosure Bulletin, vol. 37, pp. 299-302 (NN9410299).

ISO/LEC 8802-11: 1999 International Standard (ANSI/IEEE Std 802.11) Wireless LAN Medium Access Control (MAC) and Physical Layer (PHY) specifications.

Shared Wireless Access Protocol (Cordless Access) Specification, SWAP-CA Revision 1.21, Jan. 27, 1999, by the HomeRF™ Technical Committee.

Interface Specification for HomePNA™ 2.0—10M8 Technology, Dec. 1, 1999.

Interface Specification for HomePNA™ 2.0—10M8 Technology—Link Layer Protocols, Dec. 1, 1999.

Bux, "Token-Ring Local-Area Networks and Their Performance," Procs. Of the IEEE, vol. 77, No. 2, Feb. 1989.

Applied Cryptography, Second Edition: protocols, algorithms, and source code in C, Bruce Schneier, 1996.

PKCS #5 v. 20: Password-Based Cryptography Standard, RSA Laboratories, Mar. 25, 1999.

HomePlug Powerline Alliance, HomePlug 1.0.1 Specification, Dec. 1, 2001.

Lee et al., "HomePlug 1.0 powerline communication LANs—protocol description and performance results", Int. J. Commun. Syst., vol. 16 (2003).

Carrier sense multiple access with collision detection (CSMA/CD) access method and physical layer specifications, ISO/IEC 8802-3: 1996 International Standard (ANSI/IEEE Std 802.3).

Bertsekas et al., Data Networks, Prentice Hall, Englewood Cliffs, NJ, Section 2.4.3 Selective Repeat ARQ (1992).

HiPerformance Radio Local Area Network (HiperLAN) Type I: Functional Specification, European Standard (Telecommunication Series) No. 300652 V. 1.2.1 Jul. 1998.

An Architecture for Differentiated Services, IETF RFC 2475, Dec. 1998.

Goalic et al., "Real-Time Turbo-Decoding of Product Codes on a Digital Signal Processor," IEEE, pp. 624-628 (1997).

Benedetto et al., "A Soft-Input Soft-Output Maximum A Posteriori (MAP) Module to Decode Parallel and Serial Concatenated Codes," TDA Progress Report 42-127, pp. 1-20 (Nov. 1996).

Peterson et al., "Error-Correcting Codes," The MIT Press (1972).

Pyndiah, "Near-Optimum Decoding of Product Codes: Block Turbo Codes," IEEE Transactions on Communications, vol. 46, No. 8, pp. 1003-1010 (Aug. 1998).

Pyndiah, "Near Optimum Decoding of Product Codes," IEEE, pp. 339-343 (1994).

Pyndiah, "Performance of Block Turbo Coded 16-QAM and 64-QAM Modulations," IEEE, pp. 1039-1043 (1995).

Ehrsam et al, "A cryptographic key management scheme for implementing the Data Encryption Standard," IBM Syst J, vol. 17, No. 2 (1978).

* cited by examiner

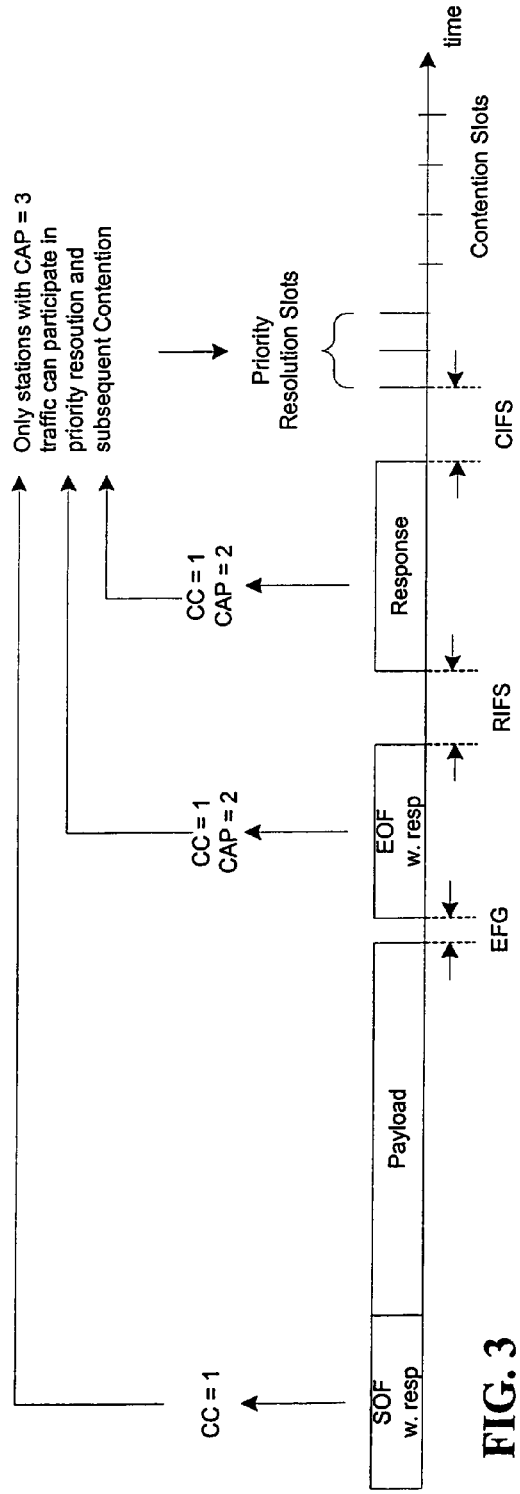
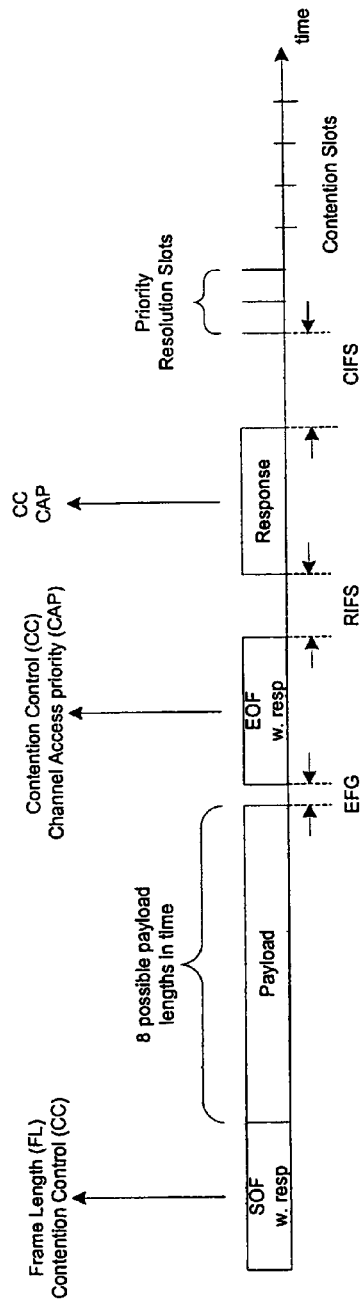

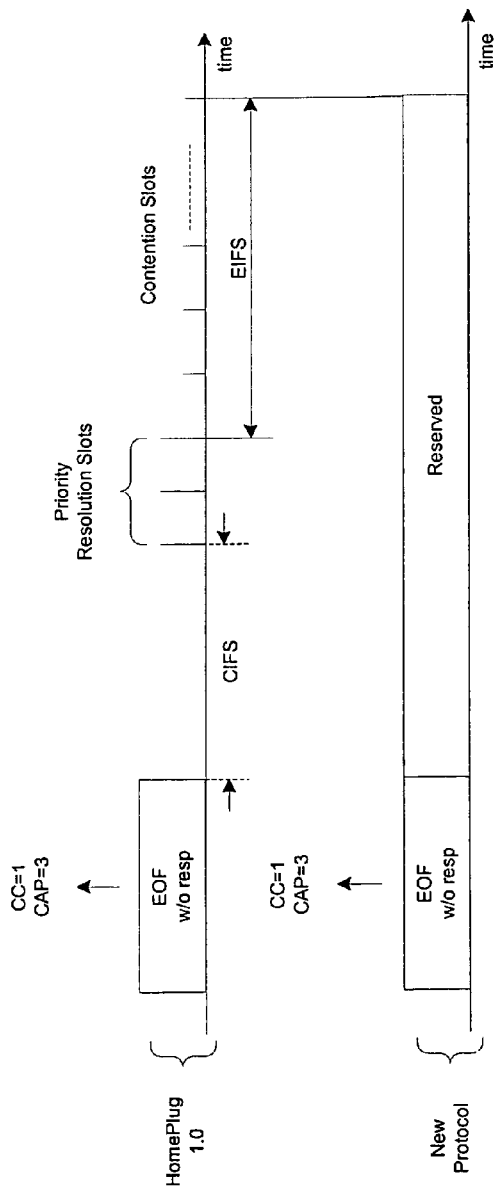
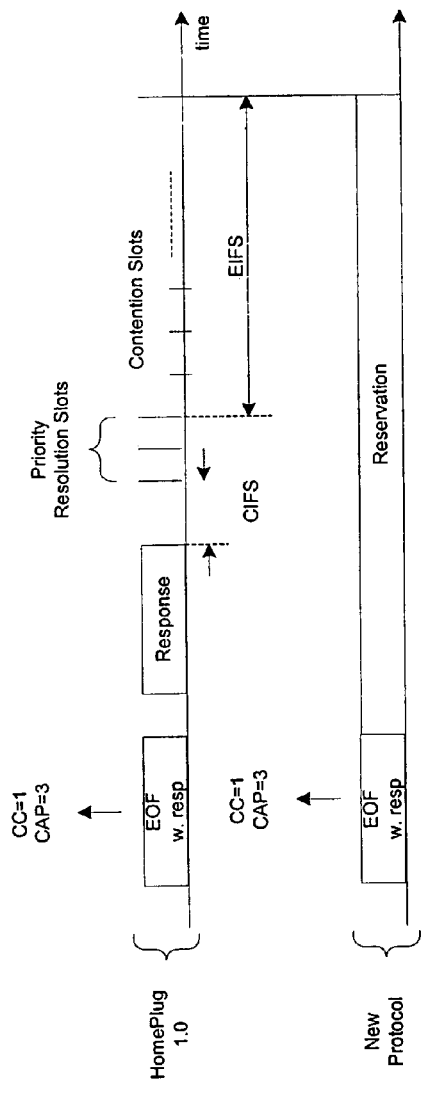
FIG. 15
FIG. 16

RESERVING TIME PERIODS FOR COMMUNICATION ON POWER LINE NETWORKS

TECHNICAL FIELD

The invention relates to network protocols adapted to coexist with existing CSMA network protocols (e.g., with the HomePlug 1.0 protocol).

BACKGROUND

Higher data rates and better quality of service (QoS) are being sought for data communication over AC power lines. New protocols that offer such improvements will preferably be capable of coexisting with existing power line communication protocols such as HomePlug 1.0. Higher data rates and better quality of service (QoS) are typically important to both in-home and Internet-access communications (those between a home and an Internet service provider). One example of the latter is Broadband over Powerline (BPL), which is being proposed for Internet access using low voltage or medium voltage power lines.

SUMMARY

In a first aspect, the invention features a method of operating in a network in which a plurality of stations communicate over a shared medium and contend for access during a priority resolution period, comprising providing a first CSMA network protocol in which at least some transmissions have a format that includes a start of frame delimiter (SOF), a payload, and an end of frame delimiter (EOF), wherein the SOF and EOF each contain sufficient information to permit a station receiving only one of the SOF and EOF to determine the start of a priority resolution period, providing a second network protocol capable of coexisting with the first protocol, so that stations may communicate using either the first or second protocol, wherein the second protocol includes transmissions that have a format that includes an SOF but not an EOF.

Preferred implementations of this aspect of the invention may incorporate one or more of the following features. The second network protocol may comprise a CSMA protocol. The second network protocol may comprise a TDMA protocol. The transmissions of the second protocol may have the effect of reserving a reserved time period during which stations following the first protocol will not transmit. The medium may comprise a power line medium. The medium may comprise a power line within a building. The medium may comprise a power line accessing a building. Stations following the second protocol use a preamble that is recognized as a preamble by the first protocol. The reserved time period may extend into the time normally occupied by the EOF according to the first CSMA network protocol. The station transmitting the SOFs without an EOF may use the reserved time period to transmit a payload. Stations other than the station transmitting the SOF without an EOF may transmit during the reserved time period. One or more stations operating in the second protocol may transmit a series of SOFs, each without an EOF, to reserve a series of reserved time periods during which stations following the first protocol will not transmit. The reserved time period may extend into a time gap between the EOF and the start of the priority resolution period. The transmissions using the first CSMA network protocol and the second network protocol may have a format that includes an SOF specifying that no response delimiter is expected. The transmissions using the first CSMA network protocol may have a format that includes an SOF capable of specifying that a response delimiter is expected, and the reserved time period may extend beyond the normal time period of the EOF into a time gap between the EOF and the response delimiter. Even though the SOF specifies that no response delimiter is expected, at least some transmissions using the second protocol may provide a response delimiter during approximately the time period normally occupied by the EOF. The transmissions using the first CSMA network protocol may have a format that includes an SOF with a contention control field for specifying that stations with a lower channel access priority than the transmitting channel should not contend during the next priority resolution period, and wherein the reserved time period may extend through the completion of the priority resolution period by using an SOF with a contention control field set to specify that stations with a lower channel access priority should not contend. The reserved time period may extend up to a maximum of about 1.695 milliseconds. The transmissions using the first CSMA network protocol may assume that the channel access priority of a transmission is the highest possible if an EOF specifying the channel access priority is not received. The transmissions using the first CSMA network protocol may have a format that includes an SOF capable of specifying that a response delimiter is expected, and by using an SOF that specifies a response delimiter the reserved time period may be further extended by the time associated with the expected response.

In a second aspect, the invention features a method of operating in a CSMA network in which a plurality of stations communicate over a shared medium and contend for access during a priority resolution period, comprising providing a first CSMA network protocol in which at least some transmissions comprise a response delimiter that includes one or more contention control parameters that can be set to specify that other stations should not contend during the next priority resolution period, providing a second network protocol capable of coexisting with the first protocol, so that stations may communicate using either the first or second protocol, wherein the second protocol includes transmissions that comprise a response delimiter in which the contention control parameters are set to specify that other stations should not contend during the next priority resolution period, wherein the transmissions of the second protocol have the effect of reserving a reserved time period during which stations following the first protocol will not transmit at least through the completion of the priority resolution period.

Preferred implementations of this aspect of the invention may incorporate one or more of the following features. The contention control parameters may comprise a contention control field and a channel access priority field, wherein the transmissions using the second protocol may have the channel access priority field set to the maximum possible value and the contention control field set to specify that only stations with a higher channel access priority field may contend during the next priority resolution period.

In a third aspect, the invention features a method of operating in a CSMA network in which a plurality of stations communicate over a shared medium and contend for access during a priority resolution period, comprising providing a first CSMA network protocol in which at least some transmissions comprise a response delimiter, followed by a period in which no information is transmitted, followed by the priority resolution period, providing a second network protocol capable of coexisting with the first protocol, so that stations may communicate using either the first or second protocol, wherein the second protocol includes transmissions that comprise a response delimiter followed by a short payload occupying the period during which no information is transmitted in the first protocol.

In a fourth aspect, the invention features a method of operating in a CSMA network in which a plurality of stations communicate over a shared medium and contend for access during a priority resolution period, comprising providing a first CSMA network protocol in which at least some transmissions have a format that includes a start of frame delimiter (SOF), a payload, and an end of frame delimiter (EOF), wherein the SOF and EOF each contain sufficient information to permit a station receiving only one of the SOF and EOF to determine the start of a priority resolution period, and wherein the SOF can specify that a response delimiter is expected, providing a second network protocol capable of coexisting with the first protocol, so that stations may communicate using either the first or second protocol, wherein the second protocol includes transmissions that have a format that includes an SOF but not an EOF, with the SOF specifying that a response delimiter is expected, wherein the transmissions of the second protocol have the effect of reserving a reserved time period during which stations following the first protocol will not transmit at least through the time normally occupied by the EOF and the response delimiter in the first protocol.

In a fifth aspect, the invention features a method of operating in a CSMA network in which a plurality of stations communicate over a shared medium and contend for access during a priority resolution period, comprising providing a first CSMA network protocol in which at least some transmissions comprise a start of frame delimiter (SOF), a payload, and an end of frame delimiter (EOF), wherein the EOF may specify whether a response delimiter is expected, providing a second network protocol capable of coexisting with the first protocol, so that stations may communicate using either the first or second protocol, wherein the second protocol includes transmissions that comprise an EOF without a preceding SOF and payload, wherein the transmissions of the second protocol have the effect of reserving a reserved time period following the EOF, during which stations following the first protocol will not transmit.

Preferred implementations of this aspect of the invention may incorporate one or more of the following features. The EOF may specify that a response delimiter is not expected, and the reserved time period following the EOF may extend to the start of the priority resolution period. The EOF may specify that a response delimiter is expected, and the reserved time period following the EOF may extend to the start of the response delimiter. The reserved time period following the EOF may extend to the start of the priority resolution period, and may include the period normally occupied by the response delimiter. The EOF of the first protocol may include one or more contention control parameters that can be set to specify that other stations should not contend during the next priority resolution period, and wherein the EOF used in the second protocol may be set to specify that other stations should not contend during the next priority resolution period, wherein the reserved time period following the EOF may be extended through the completion of the priority resolution period. The EOF may specify that a response delimiter is expected and the reserved time period following the EOF may include the time normally occupied by the response.

In a sixth aspect, the invention features a method of operating in a network in which a plurality of stations communicate over a shared medium and contend for access during a priority resolution period, comprising providing a first CSMA network protocol in which at least some transmissions have a format that includes at least one delimiter containing one or more fields in which one or more specific values are to appear, and wherein the first protocol calls for a station to wait for a period of time without transmitting if it receives a transmission in which information appearing in the one or more fields is not one of the specific values, providing a second network protocol capable of coexisting with the first protocol, so that stations may communicate using either the first or second protocol, wherein the second protocol includes certain transmissions that have a format that includes information other than the specific values in locations corresponding to the one or more fields of the first protocol, wherein the effect of the certain transmissions is to prevent stations following the first protocol from transmitting for at least the period of time.

Preferred implementations of this aspect of the invention may incorporate one or more of the following features. The at least one delimiter may comprise at least one frame control field. The at least one delimiter may comprise a start of frame (SOF) delimiter that contains at least one frame control field. The information other than the specific values may be information whose only function is to cause stations following the first protocol to wait for the time period. The information other than the specific values may be information that serves both to convey information to another station following the second protocol and to cause stations following the first protocol to wait for the time period. The effect of the certain transmissions may be to cause stations following the first protocol to behave as if they have received an invalid delimiter.

The invention provides a practical method for a second protocol to coexist with an existing CSMA network protocol (e.g. HomePlus 1.0).

Other features and advantages of the invention will be found in the detailed description, drawings, and claims.

DESCRIPTION OF DRAWINGS

FIG. 3 is a signal diagram of a prior art implementation of the HomePlug 1.0 protocol contention free access mechanism for a contention access priority (CAP) set to level 2.

FIG. 4 is a signal diagram of a prior art implementation of the HomePlug 1.0 protocol showing activity on the medium when a Long MPDU with response expected is transmitted.

FIG. 15 is a signal diagram of another implementation in which the medium is reserved by transmitting an EOF without response expected, with the contention control delimiter and channel access priority delimiter set (CC=1, CAP=3).

FIG. 16 is a signal diagram of another implementation in which the medium is reserved by transmitting an EOF with response expected, with the contention control delimiter and channel access priority delimiter set (CC=1, CAP=3).

DETAILED DESCRIPTION

An existing mechanism for multiple stations to exchange information over AC power lines is the HomePlug 1.0 protocol, which uses the well known carrier sense multiple access with collision avoidance (CSMA/CA) technique for medium sharing. Using this mechanism, a station senses the medium to determine if the medium is busy. If the medium is determined to be idle, the transmission may proceed. If the medium is busy, the station should defer until the end of the current transmission. After the end of the current transmission, stations go through a priority resolution process in the priority resolution slots. The result of the priority resolution process is that stations with the highest priority in the network will contend in the contention resolution slots while other stations defer from accessing the medium. Proper operation of the HomePlug 1.0 protocol requires that all station properly determine the start of the priority resolution period. This is achieved by using broadcast information contained in the MAC protocol data units.

MAC Protocol Data Units (MPDUs) are the basic entities that are exchanged between HomePlug 1.0 stations. MPDUs carry the higher layer data (for example, an Ethernet packet) as part of their payload. MPDUs also carry priority, Automatic Retransmission Request (ARQ), and medium timing information. The HomePlug 1.0 protocol defines two MPDU formats—a long MPDU and a short MPDU.

Figure 1:
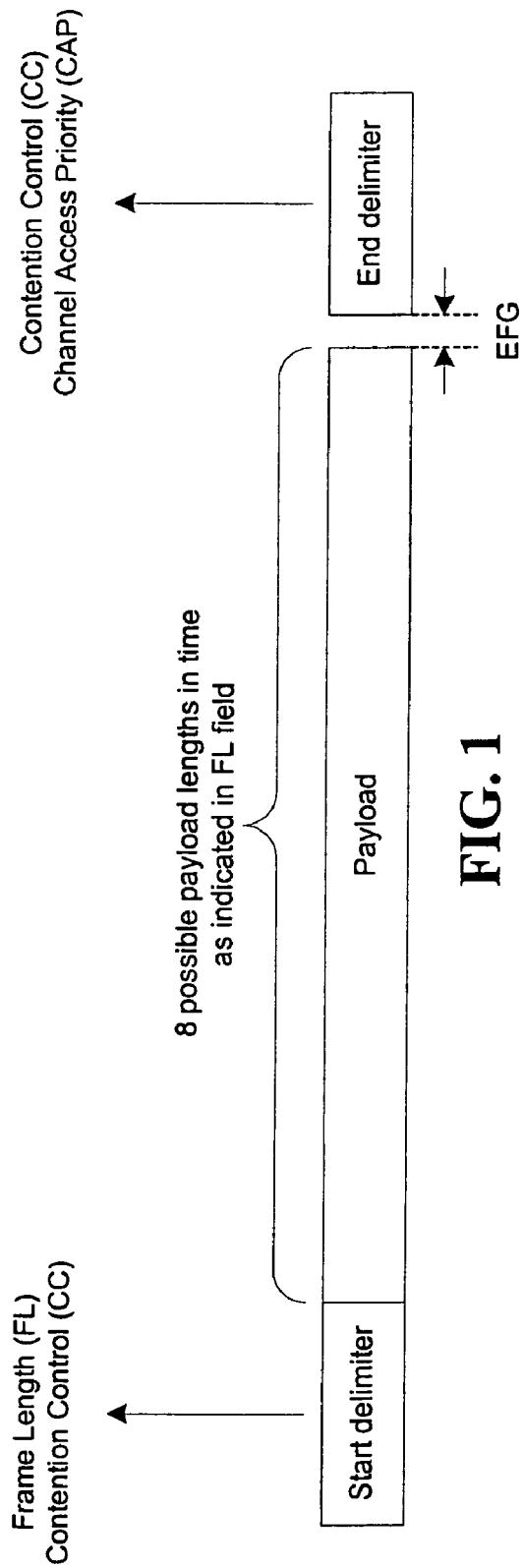
FIG. 1 is a signal diagram of a prior art implementation of a Long MPDU format in the HomePlug 1.0 protocol.

A long MPDU format comprises a start delimiter followed by a payload and an end delimiter (FIG. 1). There is an End of Frame Gap (EFG) between the payload and end delimiter. The start delimiter can be either a Start of Frame with no response expected (SOF without Response) or a Start of Frame with response expected (SOF with Response), as specified in a delimiter type (DT) field. When a response is expected, it is present at the end of the Long MPDU. The start delimiter also includes Contention Control (CC) and Frame Length (FL) fields. The Contention Control field is used to indicate whether the MPDU is part of a contention free transmission. The FL field indicates the MPDU payload length. The HomePlug 1.0 protocol supports eight long MPDU lengths. The higher layer information that is exchanged between the stations (for example, an Ethernet packet) is transmitted as part of the MPDU payload. The end delimiter can be either an End of Frame with no response expected (EOF without Response) or an End of Frame with response expected (EOF with Response), as specified in a delimiter type (DT) field. The end delimiter also includes Contention Control and Channel Access Priority (CAP) fields. The use of the Contention Control field is the same as in the corresponding field in the start delimiter. The CAP field indicates the priority of a long MPDU and is used along with the CC field for contention free transmission.

Figure 2:
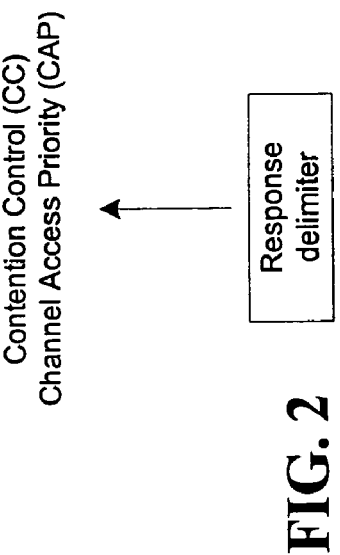
FIG. 2 is a signal diagram of a prior art implementation of a Short MPDU format in the HomePlug 1.0 protocol.

A short MPDU consists of a response delimiter (FIG. 2). It is used by a receiver to respond to a unicast or partial ARQ in multicast/broadcast transmissions. The response delimiter indicates the type of Response (ACK, NACK or FAIL). The response delimiter also includes CC and CAP information. The response delimiter, if present, is transmitted immediately following the long MPDU.

All HomePlug 1.0 delimiters are further composed of a Preamble and a Frame Control field (FIGS. 1 and 2). The Preamble is a repeating pattern that is used by receivers to determine the start of Frame Control. Frame control contains information about the Delimiter Type, Contention Control (CC), and the like. Frame control information also contains an error check field that is used to check for errors in the received Frame Control. When a delimiter fails to pass the error check, HomePlug 1.0 stations treat the delimiter as invalid. Delimiters that pass the error check can also be treated as invalid if the frame control fields (or combination of those fields) are improperly set.

Figures 5, 6:
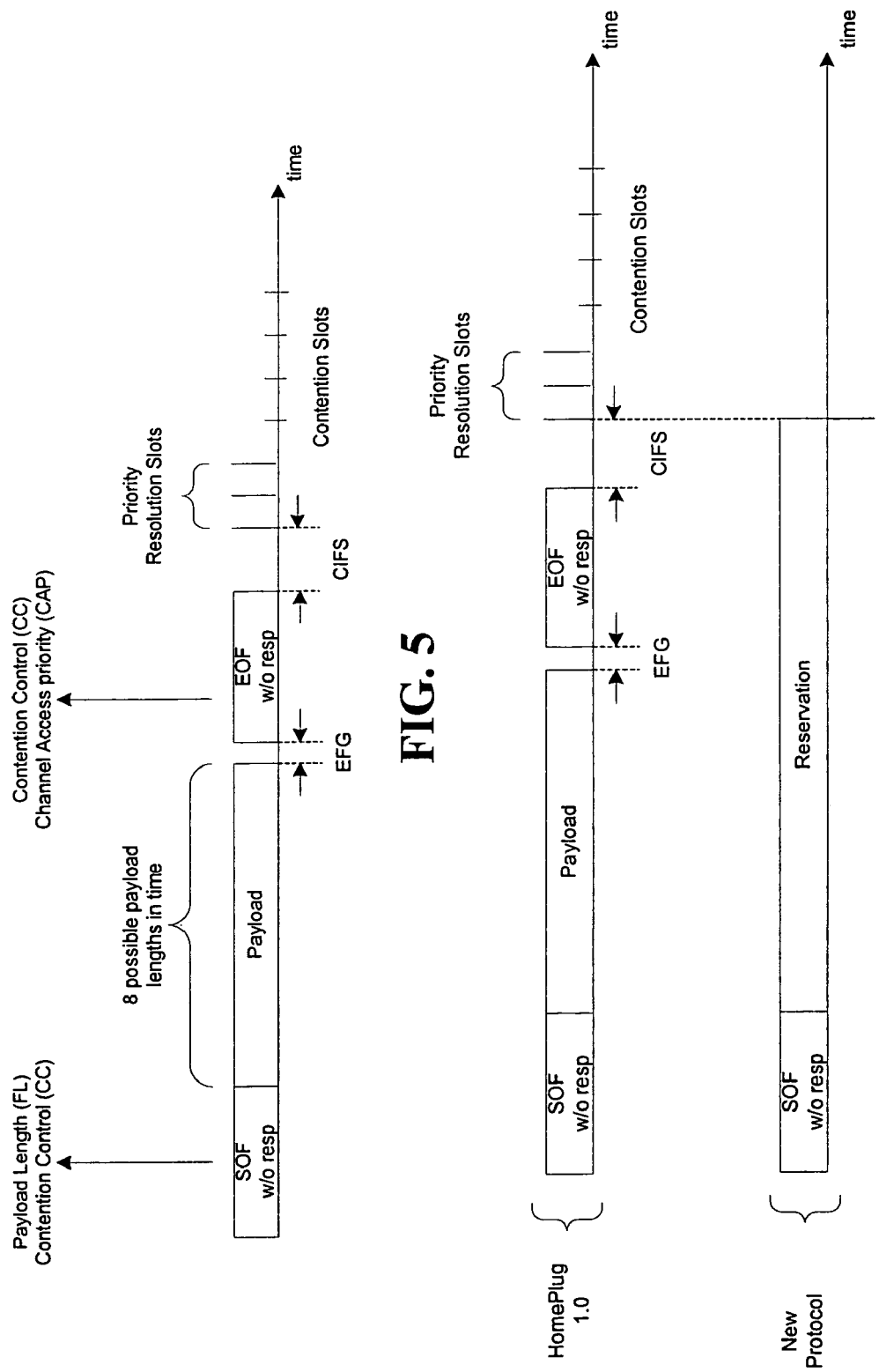
FIG. 5 is a signal diagram of a prior art implementation of the HomePlug 1.0 protocol showing activity on the medium when a Long MPDU without response expected is transmitted.
FIG. 6 is a signal diagram of one implementation of the invention in which the medium is reserved by transmitting a start of file (SOF) delimiter without response expected and by eliminating the end of file (EOF) delimiter.
Figure 7:
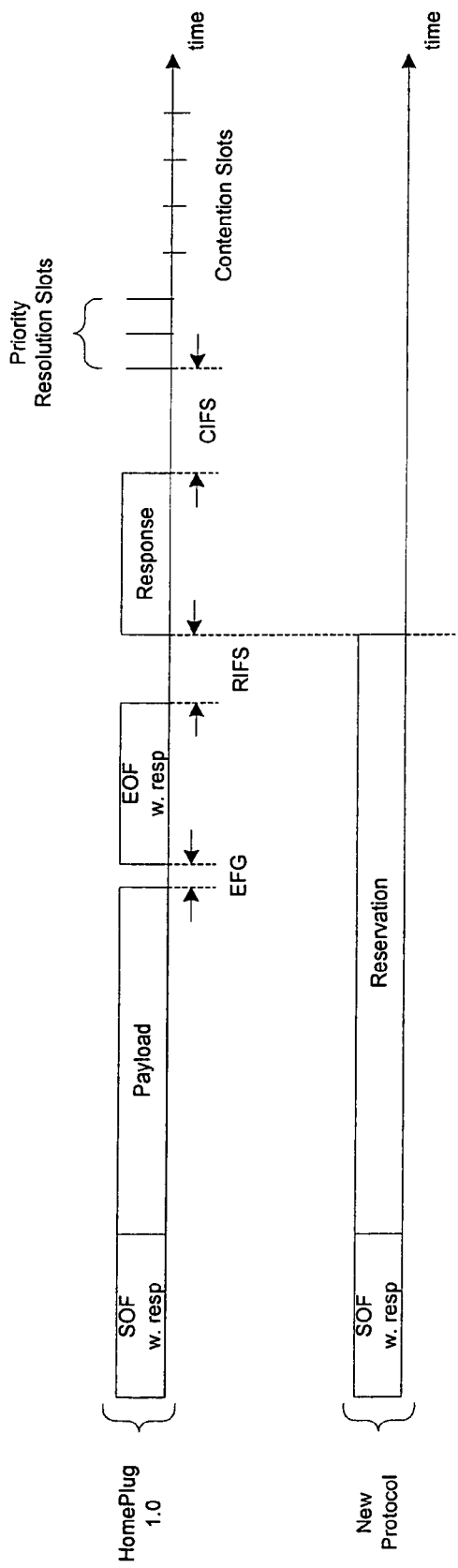
FIG. 7 is a signal diagram of another implementation in which the medium is reserved by transmitting an SOF with response expected and by eliminating the EOF.

The information contained in various delimiters along with the knowledge of various interframe spacing is used by HomePlug 1.0 stations to determine the start of the priority resolution slots. FIG. 4 shows the activity on the medium when a Long MPDU with response expected is transmitted. The response delimiter appears Response Interframe Space (RIFS) duration after the transmission of the Long MPDU. The response delimiter is followed by a Contention Interframe Space (CIFS) and the Priority Resolution Slots (PRS). Priority Resolution Slots are followed by Contention Slots. For example, if a station received a Start of Frame delimiter with response expected, it uses the FL field to determine the payload duration. From this, the location of the End of Frame delimiter, Response delimiter, and Priority resolution slots can also be determined. FIG. 5 shows the activity on the medium when a Long MPDU with no response expected is transmitted. In this case, the Long MPDU is followed by a Contention Interframe Space (CIFS) and the Priority Resolution Slots (PRS). Priority Resolution Slots are followed by Contention Slots.

If an invalid delimiter is detected when a HomePlug 1.0 station is searching for a delimiter to determine activity on the medium, the HomePlug 1.0 protocol calls for the station to refrain from transmitting for a duration of an Extended Interframe Spacing (EIFS). The EIFS is defined as the time it takes to transmit the longest MPDU with response expected, along with the corresponding Interframe Spacing and Priority Resolution Slots. An EIFS has a duration of 1695.02 microseconds. After an EIFS duration following the reception of an invalid delimiter, the station resumes searching for a delimiter. The process used by HomePlug 1.0 stations to determine whether they have detected an invalid delimiter includes using an error check sequence included in the delimiters to determine if there are any uncorrectable errors in the delimiters.

HomePlug 1.0 stations process packets received from higher layers and transfer them to the desired destination(s) using Long MPDUs. If a packet cannot fit in a single Long MPDU, the packet is segmented, and the segments are transmitted using Long MPDUs. One important aspect of the HomePlug 1.0 protocol is Segment Bursting, which allows a station to transmit MPDUs carrying segments of a packet in a single burst using a contention free access mechanism of HomePlug 1.0. Segmentation of higher layer packets is necessary when the packets do not fit in a single long MPDU. The contention free access mechanism can also be used to transmit multiple packets in a single burst. The contention free access mechanism uses the CC and CAP priority information broadcast in the delimiters. Using this mechanism, a station that has multiple segments pending sets the CC to 0b1 and the CAP to the packet priority in the first MPDU. For Long MPDUs that require a response, the receiver repeats the received CC and CAP in the Response delimiter. When stations detect a transmission with CC set to 0b1, they defer from priority resolution if their traffic has a priority that is less than or equal to the CAP. They will further refrain form accessing the medium for a duration of the EIFS following the priority resolution slots. Thus, the station can continue to transmit the remainder of the MPDUs with CC set to 0b1. The last MPDU in the burst is transmitted with CC set to 0b0, thus allowing other stations to access the medium. FIG. 3 shows an example in which a long MPDU and the corresponding Response are transmitted with CC=1 and CAP=2. In this example, only stations with CAP=3 traffic can participate in the priority contention and subsequent contention. Since the start delimiter does not carry CAP information, a station that receives only the start delimiter assumes that the CAP is 3.

FIGS. 6-20 show different implementations in which novel uses are made of HomePlug 1.0 delimiters (e.g., start of frame (SOF), end of frame (EOF), and response) to permit other protocols to reserve varying periods of time on the medium.

Elimination of End of File (EOF) Delimiter

HomePlug 1.0 stations use a start of frame (SOF) delimiter and an end of frame (EOF) delimiter in the Long MPDU. The EOF delimiter provides information on channel access priority for stations that have already detected the corresponding start delimiter. For stations that have not detected the corresponding SOF, the EOF also provides information on the start time of the priority resolution slots. The performance of HomePlug 1.0 stations is not significantly affected by the absence of an EOF. This fact can be used by other protocols to reserve longer periods of time on the medium by not sending an EOF. The time that would have been used to send an EOF is instead added to the reserved time period, which can thereby be lengthened, e.g., by the sum of the end of frame gap (EFG) and the EOF duration. In some implementations (e.g., FIG. 6), the time reserved may include both the time normally occupied by the EOF and by the contention interframe space (CIFS). In others (e.g., FIG. 7), the time reserved may include the EOF and the response interframe space (RIFS). In still others, the time reserved may include the EOF, the RIFS, the Response, and the CIFS. The figures each include two signal diagrams, the top one showing the activity expected by the HomePlug 1.0 protocol, and the bottom one showing the medium reservation duration obtained by other protocols coexisting with HomePlug 1.0.

Transmitting Response during End of File (EOF) Delimiter

Figure 8:
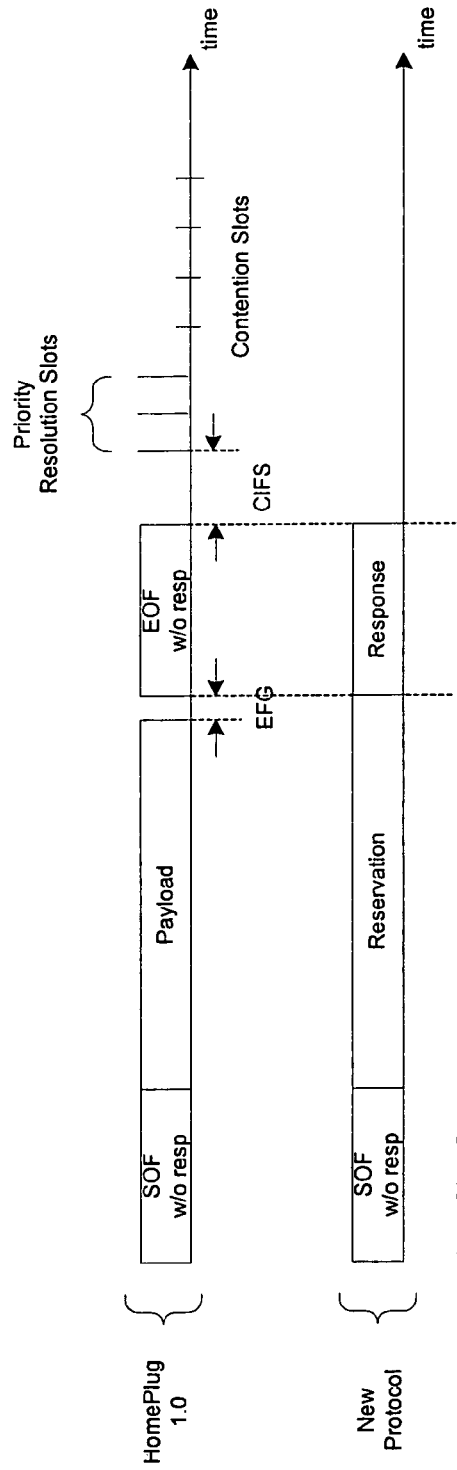
FIG. 8 is a signal diagram of another implementation in which the medium is reserved by transmitting an SOF without response expected, and by sending a response during the interval normally occupied by the EOF.

The HomePlug 1.0 protocol supports eight payload lengths with response expected (as specified by a three bit FL field). Greater granularity in the medium reservation can be obtained in other protocols coexisting with HomePlug 1.0, for transmissions that require a response, by transmitting a start delimiter with no response expected and receiving the response delimiter at the time when an end of frame delimiter is expected in HomePlug 1.0 (FIG. 8). In this way, the other protocols still communicate the response information but in an out of band manner.

Contention Free Start of Frame (SOF) Delimiter

The contention control delimiters of the HomePlug 1.0 protocol can be used by other protocols to reserve time periods on the medium. In the HomePlug 1.0 protocol, the start of frame (SOF) delimiter does not contain the channel access priority (CAP), and stations that receive an SOF with the contention control (CC) bit set to 1 (indicating contention free transmission) assume that the CAP is the maximum (CAP=3), and do not contend in the upcoming priority resolution slots, and defer from accessing the medium for an Extended Inter Frame Space (EIFS=1695.02 microseconds) following the priority resolution slots. Thus, by transmitting an SOF delimiter with CC=1, other protocols can reserve for a maximum of up to EIFS duration following the priority resolution slots.

Figure 9:
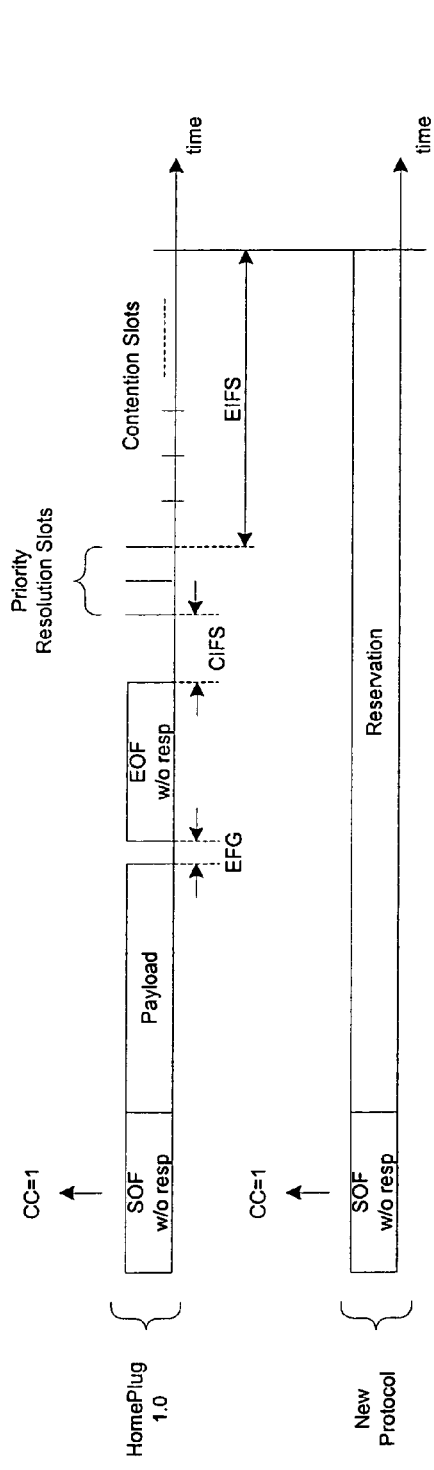
FIG. 9 is a signal diagram of another implementation in which the medium is reserved by transmitting an SOF without response expected, with a contention control delimiter set (CC=1).
Figure 10:
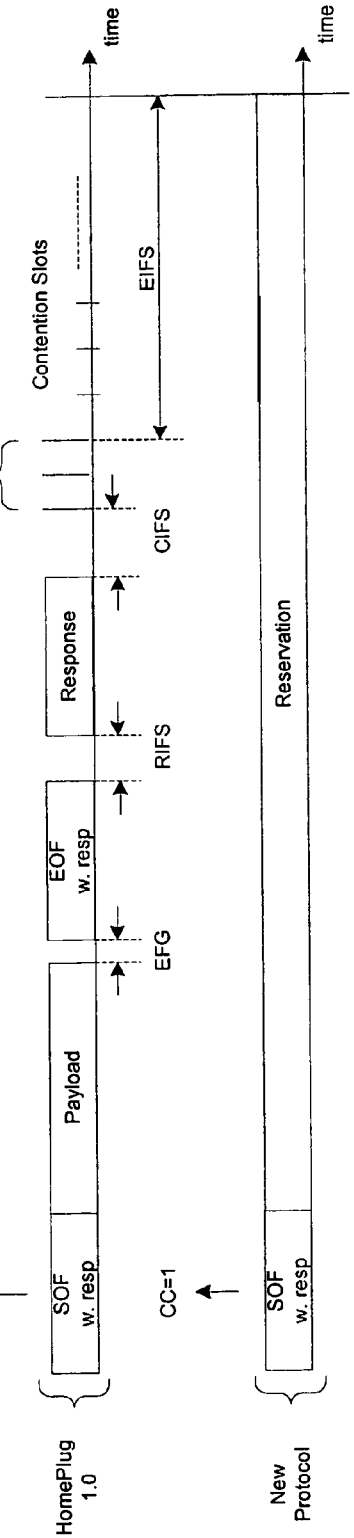
FIG. 10 is a signal diagram of another implementation in which the medium is reserved by transmitting an SOF with response expected, with a contention control delimiter set (CC=1).

FIGS. 9 and 10 show two examples. In FIG. 9, an SOF delimiter with no response expected is transmitted, with the Contention control bit set to 1. This has the effect of reserving the medium for up to an EIFS duration of time following the priority resolution slots (no EOF is transmitted). In FIG. 10, an SOF delimiter with response expected is transmitted, with the Contention control bit set to 1. This reserves the medium for up to an EIFS duration of time following the priority resolution slots (no EOF or Response is transmitted). The reserved period on FIG. 10 is longer than in FIG. 9, by the duration of the expected RIFS and Response.

Long Responses

Figure 11:
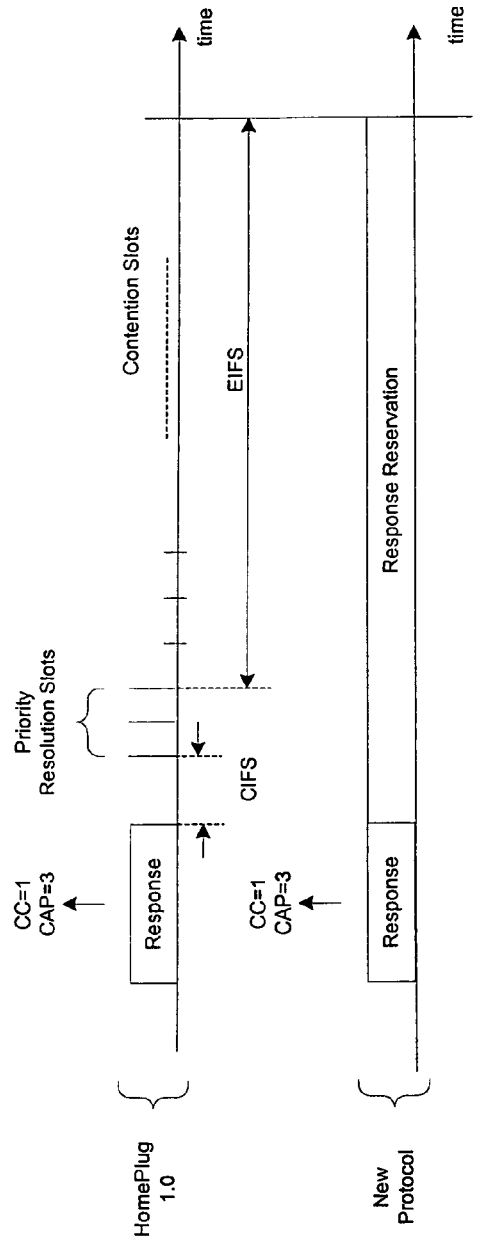
FIG. 11 is a signal diagram of another implementation in which the medium is reserved by transmitting a Response delimiter with the contention control delimiter and channel access priority delimiter set (CC=1, CAP=3).
Figure 12:
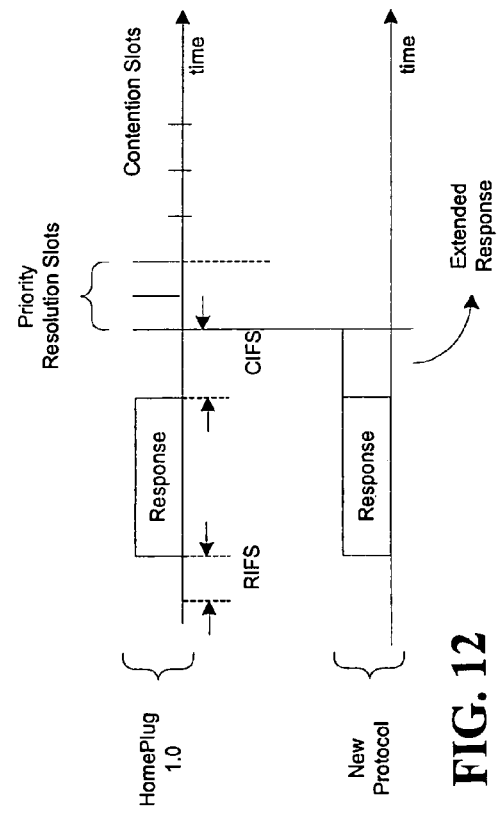
FIG. 12 is a signal diagram of another implementation in which the medium is reserved for a period by transmitting a Response delimiter.

The HomePlug 1.0 protocol contemplates transmission of Short MPDUs consisting of a Response delimiter. Other protocols coexisting with HomePlug 1.0 may reserve time periods on the medium by transmitting a Response delimiter with the contention control bit set to 1 and the channel access priority set to 3 (FIG. 11). All HomePlug 1.0 stations on the network will defer from asserting in the priority resolution slots and the subsequent contention resolution slots, and up to an EIFS duration after the priority resolution slots.

Long End of File (EOF) Delimiter

Figure 13:
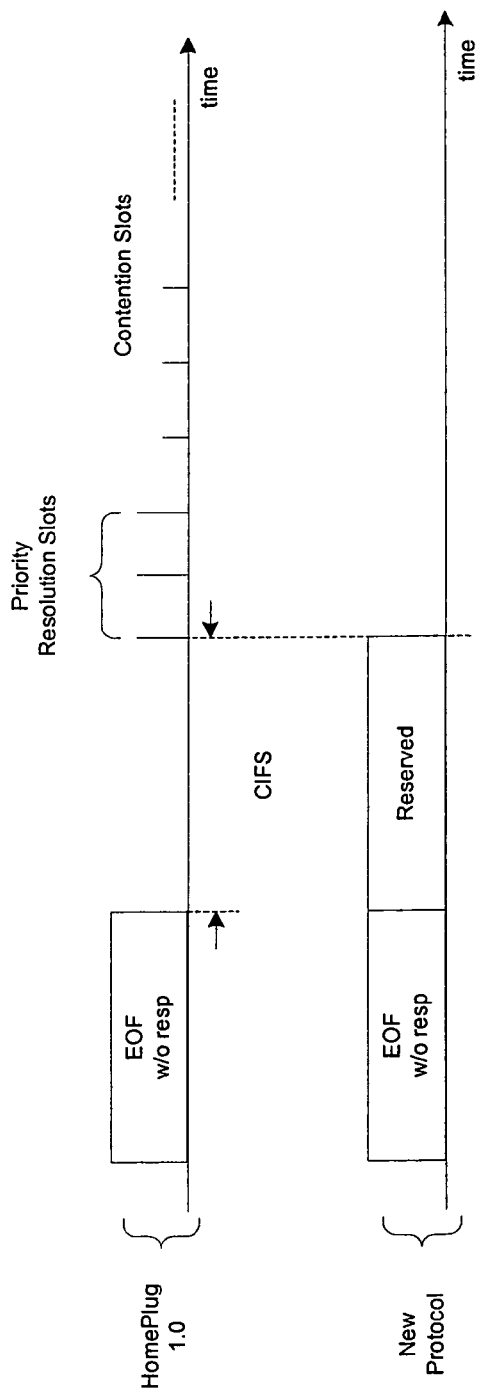
FIG. 13 is a signal diagram of another implementation in which the medium is reserved by transmitting an EOF without response expected.
Figure 14:
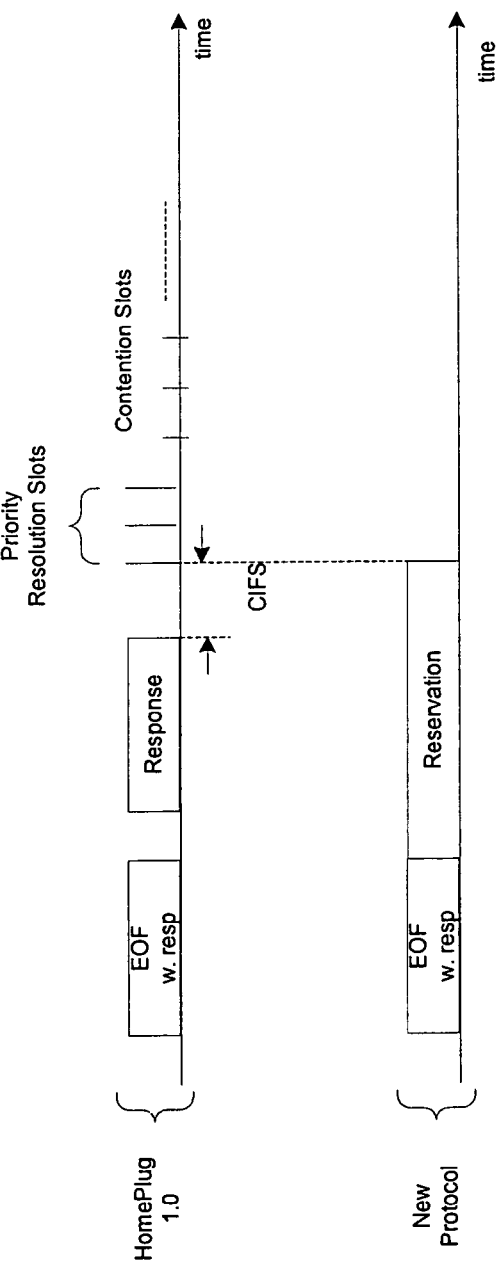
FIG. 14 is a signal diagram of another implementation in which the medium is reserved by transmitting an EOF with response expected.
Figure 21:
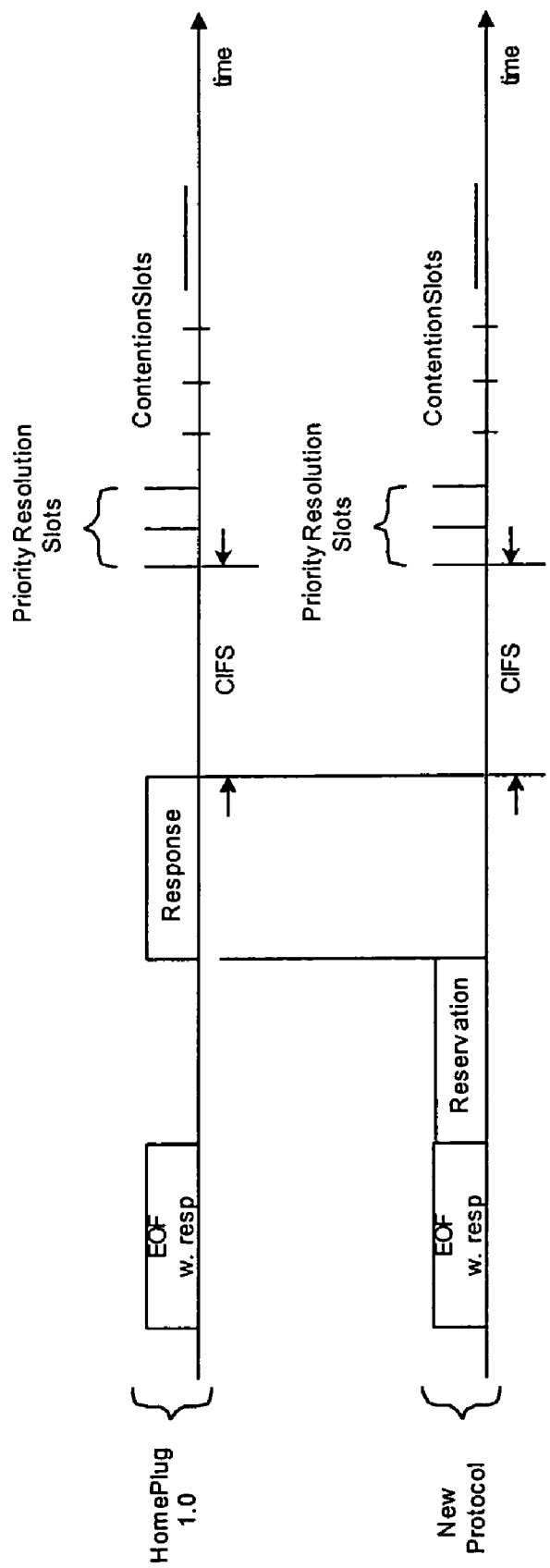
FIG. 21 is a signal diagram of another implementation in which the medium is reserved by transmitting an EOF with response expected.

When a HomePlug 1.0 station is searching for a delimiter in a contention window (in an idle or EIFS state), the station can properly receive and interpret all delimiters (SOF, Response, or EOF). The contention window extends for an EIFS duration after the end of the priority resolution slots. A station goes into idle state if it is searching for a delimiter and does not find one for an EIFS time. For example, if a station does not find a delimiter for EIFS time in the contention window, it goes into an idle state. The fact that an EOF can be properly received under these states can be taken advantage of in other protocols. An EOF can be transmitted to reserve the medium up to the start of priority resolution slots, and an EOF with contention control bits set appropriately can be transmitted to reserve the medium up to an EIFS duration of time following the end of the priority resolution slots. FIG. 13 shows transmitting an EOF delimiter with no response expected to reserve the medium up to the start of the priority resolution slots. FIG. 14 shows transmitting an EOF delimiter with response expected to reserve the medium up to the start of the priority resolution period. Alternatively, the reservation may extend only to the start of the response delimiter (FIG. 21). FIG. 15 shows transmitting an EOF delimiter with no response expected and the contention control bit set to 1 to reserve the medium for up to an EIFS duration following the end of priority resolution slots. FIG. 16 shows transmitting an EOF delimiter with response expected and the contention control bit set to 1 to reserve the medium for up to an EIFS duration following the priority resolution slots.

The response delimiter can also be used in place of the EOF delimiter. For example, a response delimiter can be transmitted during the contention window to reserve the medium up to the start of the priority resolution slots. A response delimiter with the contention control bit set to 1 and the channel access priority equal to 3 can be transmitted during the contention window to reserve the medium up to an EIFS duration following the end of response delimiter.

Invalid Delimiters

The HomePlug 1.0 has various delimiters that have one or more fields that the protocol expects to have certain values and combinations of values. If these values or combinations of values are not what the protocol expects, it regards the delimiter as invalid. When a HomePlug 1.0 station detects an invalid delimiter, the station waits for an EIFS duration before accessing the medium. This behavior can be exploited to reserve the medium for an EIFS duration by intentionally transmitting values of one or more fields that are invalid in the HomePlug 1.0 protocol. Some example of invalid delimiters include: (1) Delimiter type set to 0b110 or 0b111. (2) Start of Frame (SOF) delimiter with Frame Length (FL) field set to a value in the range 0b000010000-0b11111111. (3) Start of Frame delimiter with Tone Map Index in the range 0b10000-0b11111. (4) Start of Frame with Tone Map Index set to 0b00000, and FL set to one of the following values {0b00000000, 0b00000010, 0b00000100, 0b00000110}. (5) End of Frame delimiter with INVALID field set to 0b1. (6) Delimiter with a CRC error.

When a HomePlug 1.0 preamble is transmitted without a frame control, HomePlug 1.0 stations will (with high probability) interpret it as an invalid delimiter as the result of a CRC error. This mechanism can also be exploited to reserve the medium for an EIFS duration. Thus, the medium may be reserved by transmitting an invalid HomePlug 1.0 delimiter, or by transmitting a HomePlug 1.0 preamble.

Figure 17:
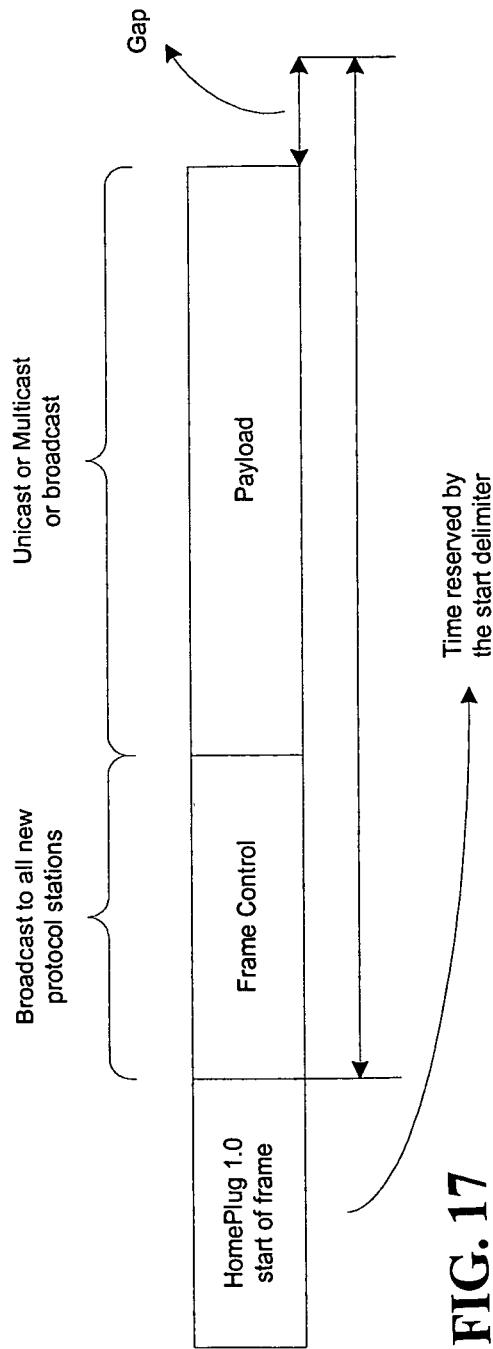
FIG. 17 is a signal diagram of another implementation in which the transmission of an SOF reserves the medium for a single payload.

In one implementation, stations follow a new protocol that uses the start of frame (SOF) delimiter to reserve time periods for their own transmissions. Stations use the reserved time periods to transmit a broadcast frame control field (carrying new protocol specific information) followed by a payload field that can contain unicast/multicast/broadcast information (FIG. 17). A protocol specific gap may be left before the end of reservation interval.

Figure 18:
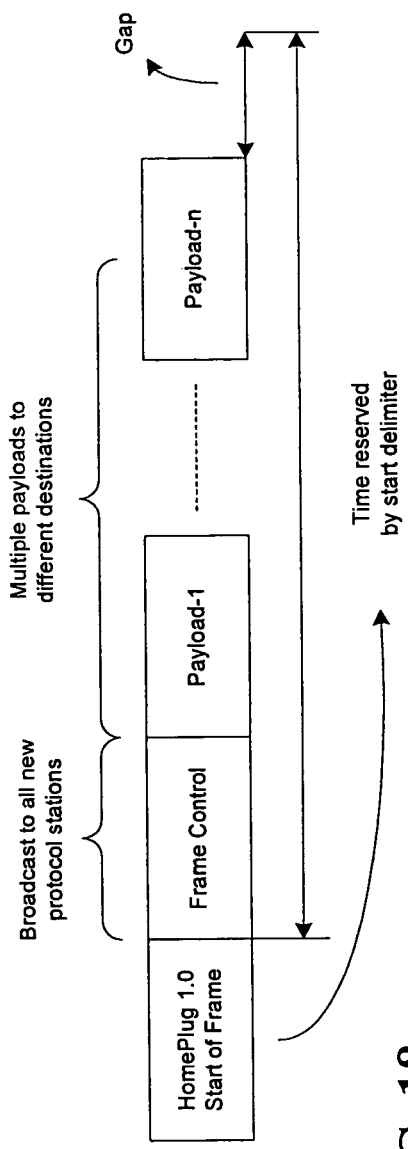
FIG. 18 is a signal diagram of another implementation in which the transmission of an SOF reserves the medium for a series of payloads.

In another implementation, the reserved time periods may contain a broadcast frame control followed by multiple payloads. In this case each payload can potentially be transmitted to different destinations (FIG. 18).

For transmissions that require a response, stations may use the start delimiter with response expected. The EOF is eliminated, and the transmission duration is extended through the period normally occupied by the response. Eight different transmission granularities can be obtained using this approach. Further granularity in the transmissions can be obtained by using the start delimiter with no response. In this case, the information about the presence of a response can be transmitted in an out of band manner. For example it can be conveyed through the frame control information transmitted during the reserved interval (FIG. 17). Another option is to always assume that a response is present. The response may be transmitted during the time normally occupied in Home-Plug 1.0 by the EOF. This provides eight additional transmission granularities, for a total of sixteen possible MPDU lengths.

Figure 20:
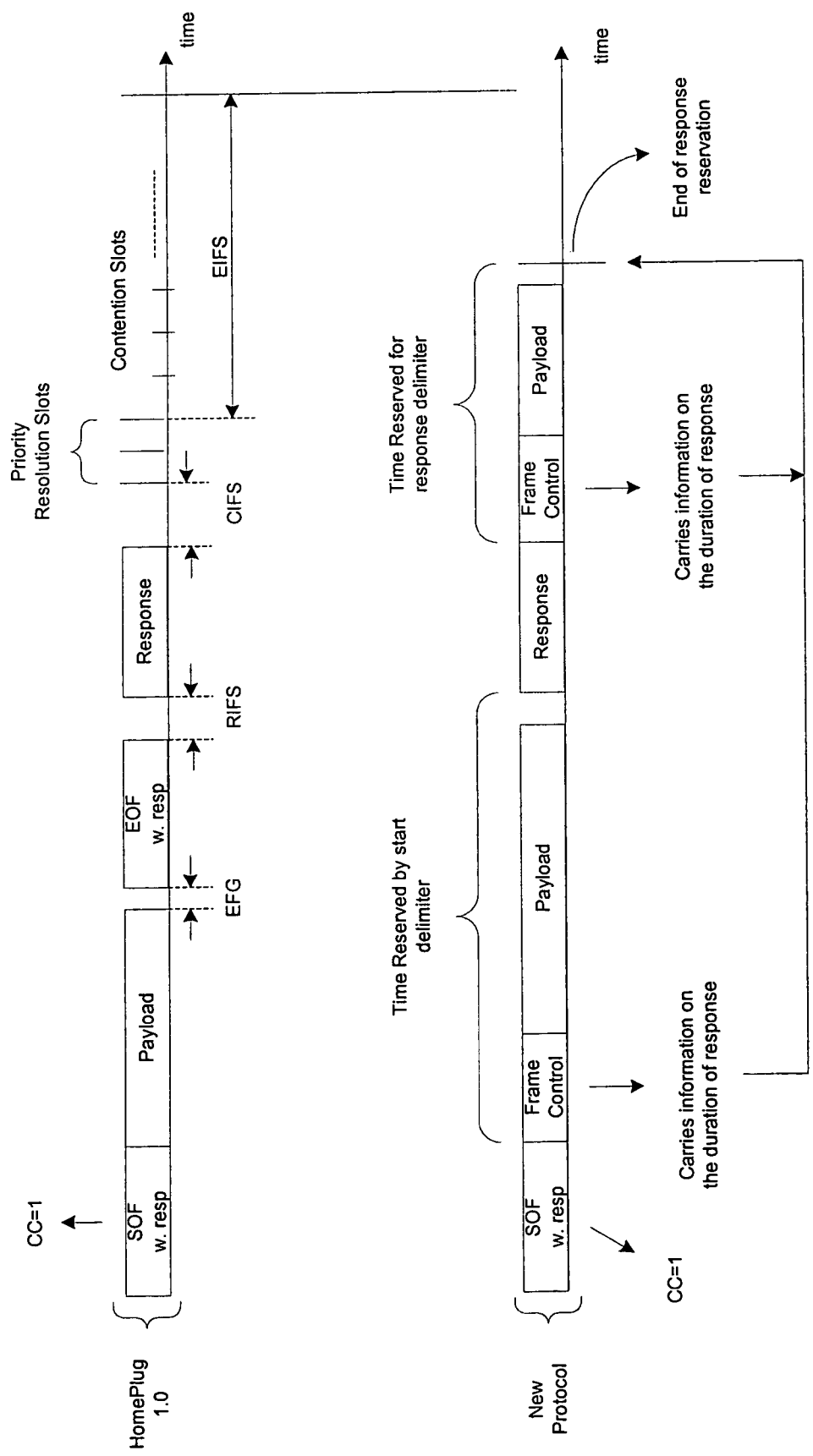
FIG. 20 is a signal diagram of another implementation in which the medium is reserved for a first period by transmitting an SOF, and for a following second period by transmission of a response delimiter.

The response for these transmissions can extend into the CIFS. In one implementation, the extended response carries broadcast information relevant to the new protocol. In another implementation, the contention control (CC) bit in the corresponding start delimiter is set to 1, and CC is set to 1 and CAP set to 3 in the response. This is capable of reserving the medium for a response. The information transmitted in the response has the same format as in FIG. 17. This enables responses to carry payload information. One implementation here is to include the duration of the response in the preceding transmission (i.e., the frame control transmitted in the reserved duration following the start of frame). This is repeated in the response so that stations that hear any of these transmissions know when the response interval ends. FIG. 20 shows an example of such an implementation.

Transmissions that do not require a response can use an SOF with no response expected delimiter to reserve time periods extending up to the priority resolution slots. They can also use an SOF with response expected delimiter to reserve time periods extending up to the priority resolution slots. In this case, the absence of a response may be indicated in an out of band manner. For example, the frame control information (FIG. 17) may be used.

Reservations of extra long time periods may be obtained by using the SOF with no response expected, with the contention control (CC) bit set to 1 and the channel access priority (CAP) set to 3. In this case transmission duration can extend up to the priority resolution slots and into the contention window. The SOF with response expected delimiter can also be used in a similar manner. In this case, the absence of response is conveyed in an out of band manner. For example, the frame control information transmitted can contain this information. It is advantageous to have the delimiters transmitted at least once every EIFS duration of time. Some implementations may restrict the choice of start delimiters to FL=7 with no response expected, and shorten the reserved time period to extend only to the priority resolution slots. This ensures that at least two delimiters are transmitted every EIFS duration. Note that EIFS is the time from the start of an SOF delimiter with FL=7 and response expected to the end of the priority resolution slots, i.e., it is the time taken to transmit the largest MPDU in HomePlug 1.0.

Other implementation can reserve short time periods using the end delimiter or the response delimiter during the contention window. For example, protocols that use orderly access of the medium (e.g., as described in U.S. application Ser. No. 10/695,371, entitled "Contention-Free Access Intervals on a CSMA Network," filed on Oct. 21, 2003) can use an EOF delimiter with no response expected to hand over a session when there is no pending payload to be transmitted. The shorter time reservations achieved using these delimiters can reduce time wasted on the medium.

Figure 19:
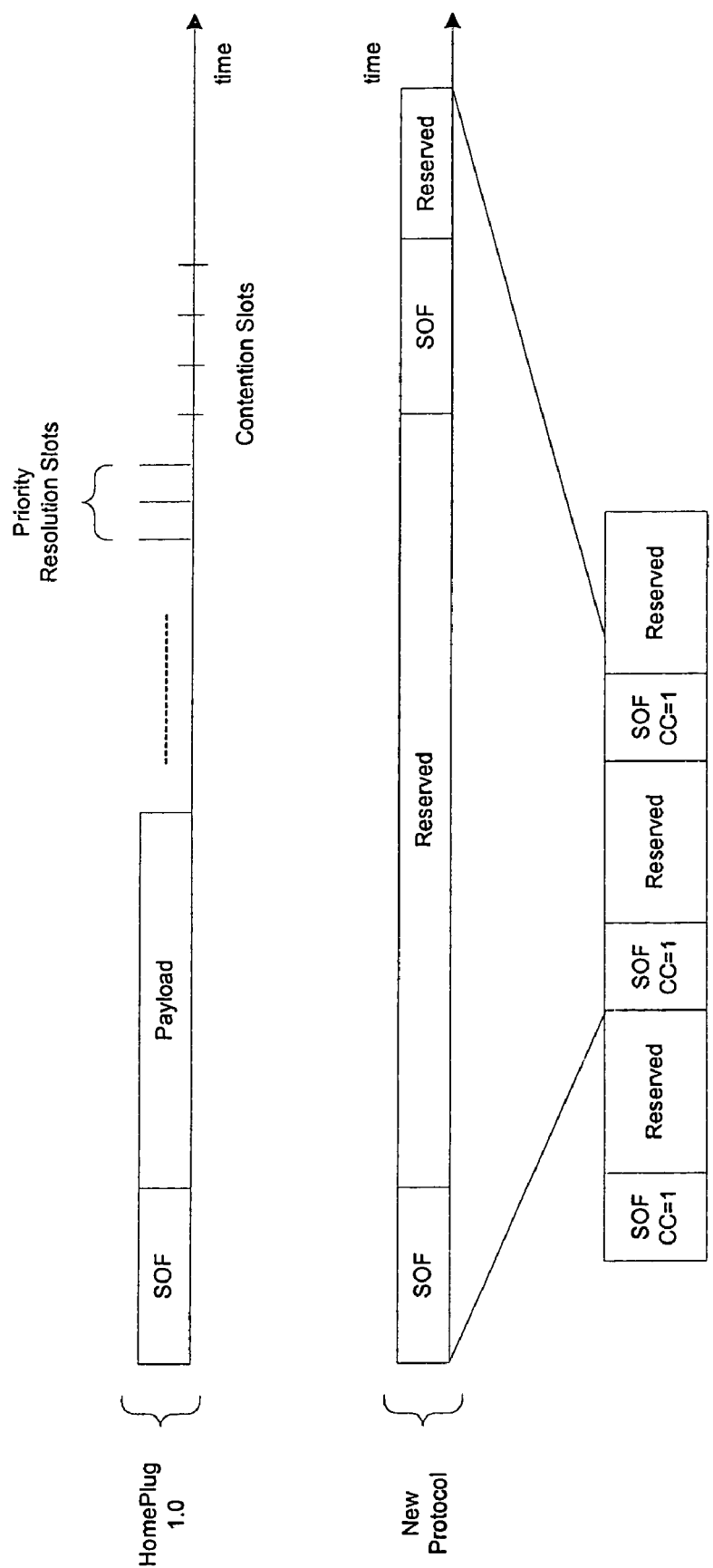
FIG. 19 is a signal diagram of another implementation in which the transmission of a series of SOFs reserves the medium for an extended period.

Another implementation is to use a series of start delimiters to prevent HomePlug 1.0 stations from accessing the medium during a reserved time period. In this case, the contention control bit is set to 1 for all intermediate start delimiters (FIG. 19). One implementation is to set FL=7 and RE=1 in the SOF delimiter. Subsequent SOF delimiters are transmitted in the first contention slot following the priority resolution slots. Another implementation is to set FL=7 and RE=0 in the start of frame delimiter. The start delimiters can be transmitted by one or more stations either simultaneously or alternatively. The medium can be released for HomePlug 1.0 access by transmitting a delimiter with the contention control bit set to zero.

Prior to transmission of the series of start delimiters, the stations following the other protocol may need to contend with HomePlug 1.0 stations to ensure medium reservation is proper.

Many other implementations other than those described above are within the invention, which is defined by the following claims. As mentioned earlier, it is not possible to describe here all possible implementations of the invention, but a few possibilities not mentioned above include the following. Although some implementations are particularly well suited for communication over power lines, other implementations are applicable to communication over other media.

What is claimed is:

1. A method of operating in a network in which a plurality of stations communicate over a shared medium and contend for access during a priority resolution period, comprising:
providing a first CSMA network protocol in which at least some transmissions have a format that includes a start of frame delimiter (SOF), a payload, and an end of frame delimiter (EOF), wherein the SOF and EOF each contain sufficient information to permit a station receiving only one of the SOF and EOF to determine the start of a priority resolution period; and
providing a second network protocol capable of coexisting with the first protocol, so that stations may communicate using either the first or second protocol,
wherein the second protocol includes transmissions that have a format that includes an SOF but not an EOF,
wherein the transmissions of the second protocol have the effect of reserving a reserved time period during which stations following the first protocol will not transmit, and
wherein the reserved time period extends into the time normally occupied by the EOF according to the first CSMA network protocol.

2. The method of claim 1 wherein the second network protocol comprises a CSMA protocol.

3. The method of claim 1 wherein the second network protocol comprises a TDMA protocol.

4. The method of claim 1 wherein the station transmitting the SOFs without an EOF uses the reserved time period to transmit a payload.

5. The method of claim 1 wherein stations other than the station transmitting the SOF without an EOF transmit during the reserved time period.

6. The method of claim 1 wherein one or more stations operating in the second protocol transmits a series of SOFs, each without an EOF, to reserve a series of reserved time periods during which stations following the first protocol will not transmit.

7. The method of claim 1 wherein the transmissions using the first CSMA network protocol and the second network protocol have a format that includes an SOF specifying that no response delimiter is expected.

8. The method of claim 7 wherein, even though the SOF specifies that no response delimiter is expected, at least some transmissions using the second protocol provide a response delimiter during approximately the time period normally occupied by the EOF.

9. The method of claim 1 wherein the medium comprises a power line within a building.

10. The method of claim 1 wherein the medium comprises a power line accessing a building.

11. A method of operating in a network in which a plurality of stations communicate over a shared medium and contend for access during a priority resolution period, comprising
providing a first CSMA network protocol in which at least some transmissions have a format that includes a start of frame delimiter (SOF), a payload, and an end of frame delimiter (EOF), wherein the SOF and EOF each contain sufficient information to permit a station receiving only one of the SOF and EOF to determine the start of a priority resolution period; and
providing a second network protocol capable of coexisting with the first protocol, so that stations may communicate using either the first or second protocol,
wherein the second protocol includes transmissions that have a format that includes an SOF but not an EOF,
wherein the transmissions of the second protocol have the effect of reserving a reserved time period during which stations following the first protocol will not transmit, and
wherein the reserved time period extends into a time gap between the EOF and the start of the priority resolution period.

12. A method of operating in a network in which a plurality of stations communicate over a shared medium and contend for access during a priority resolution period, comprising
providing a first CSMA network protocol in which at least some transmission have a format that includes a start of frame delimiter (SOF), a payload, and an end of frame delimiter (EOF), wherein the SOF and EOF each contain sufficient information to permit a station receiving only one of the SOF and EOF to determine the start of a priority resolution period;
providing a second network protocol capable of coexisting with the first protocol, so that stations may communicate using either the first or second protocol,
wherein the second protocol includes transmissions that have a format that includes an SOF but not an EOF,
wherein the transmissions of the second protocol have the effect of reserving a reserved time period during which stations following the first protocol will not transmit, and
wherein the transmissions using the first CSMA network protocol have a format that includes an SOF capable of specifying that a response delimiter is expected, and the reserved time period extends beyond the normal time period of the EOF into a time gap between the EOF and the response delimiter.

13. A method of operating in a network in which a plurality of stations communicate over a shared medium and contend for access during a priority resolution period, comprising
providing a first CSMA network protocol in which at least some transmission have a format that includes a start of frame delimiter (SOF), a payload, and an end of frame delimiter (EOF), wherein the SOF and EOF each contain sufficient information to permit a station receiving only one of the SOF and EOF to determine the start of a priority resolution period;

providing a second network protocol capable of coexisting with the first protocol, so that stations may communicate using either the first or second protocol, wherein the second protocol includes transmissions that have a format that includes an SOF but not an EOF, wherein the transmissions of the second protocol have the effect of reserving a reserved time period during which stations following the first protocol will not transmit, and wherein the transmissions using the first CSMA network protocol have a format that includes an SOF with a contention control field for specifying that stations with a lower channel access priority than the transmitting channel should not contend during the next priority resolution period, and wherein the reserved time period can extend through the completion of the priority resolution period by using an SOF with a contention control field set to specify that stations with a lower channel access priority should not contend.

14. The method of claim 13 wherein the reserved time period extends up to a maximum of about 1.695 milliseconds.

15. The method of claim 13 wherein one or more stations operating in the second protocol transmit a series of SOFs, each without an EOF, to reserve a series of reserved time periods during which stations following the first protocol will not transmit.

16. The method of claim 13 wherein the transmissions using the first CSMA network protocol assume that the channel access priority of a transmission is the highest possible if an EOF specifying the channel access priority is not received.

17. The method of claim 13 wherein the transmissions using the first CSMA network protocol have a format that includes an SOF capable of specifying that a response delimiter is expected, and by using an SOF that specifies a response delimiter the reserved time period can be further extended by the time associated with the expected response.

18. The method of claim 17 wherein the reserved time period extends up to a maximum of about 1.695 milliseconds.

19. A method of operating in a CSMA network in which a plurality of stations communicate over a shared medium and contend for access during a priority resolution period, comprising:

providing a first CSMA network protocol in which at least some transmissions comprise a start of frame delimiter (SOF), a payload, and an end of frame delimiter (EOF), wherein the EOF may specify whether a response delimiter is expected; and providing a second network protocol capable of coexisting with the first protocol, so that stations may communicate using either the first or second protocol, wherein the second protocol includes transmissions that comprise an EOF without a preceding SOF and payload, wherein the transmissions of the second protocol have the effect of reserving a reserved time period following the EOF, during which stations following the first protocol will not transmit, the reserved time period extending to the start of the priority resolution period, wherein the EOF of the first protocol includes one or more contention control parameters that can be set to specify that other stations should not contend during the next priority resolution period, and wherein the EOF used in the second protocol is set to specify that other stations should not contend during the next priority resolution period, wherein the reserved time period following the EOF can extend through the completion of the priority resolution period.

20. The method of claim 19 wherein the transmissions using the first CSMA network protocol and the second network protocol have a format that includes an EOF specifying that a response delimiter is not expected, and the reserved time period following the EOF extends to the start of the priority resolution period.

21. The method of claim 19 wherein the transmissions using the first CSMA network protocol and the second network protocol have a format that includes an EOF specifying that a response delimiter is expected, and the reserved time period following the EOF extends to the start of the response delimiter.

22. The method of claim 21 wherein the reserved time period following the EOF extends to the start of the priority resolution period, and includes the period normally occupied by the response delimiter.

23. The method of claim 19 wherein the transmissions using the first CSMA network protocol and the second network protocol have a format that includes an EOF specifying that a response delimiter is expected and the reserved time period following the EOF can include the time normally occupied by the response.

24. The method of claim 1, 11, 12, 13, or 19, wherein the medium comprises a power line medium.

25. The method of claim 1, 11, 12, 13, or 19, wherein stations following the second protocol use a preamble that is recognized as a preamble by the first protocol.

* * * * *

UNITED STATES PATENT AND TRADEMARK OFFICE
CERTIFICATE OF CORRECTION

PATENT NO. : 7,636,370 B2
APPLICATION NO. : 11/071059
DATED : December 22, 2009
INVENTOR(S) : Yonge, III et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1159 days.

Signed and Sealed this

Ninth Day of November, 2010

David J. Kappos
*Director of the United States Patent and Trademark Office*